(12) United States Patent
Farhadiroushan et al.

(10) Patent No.: US 6,417,926 B1
(45) Date of Patent: Jul. 9, 2002

(54) WAVELENGTH MEASURING SYSTEM

(75) Inventors: Mahmoud Farhadiroushan, London; Tom Richard Parker, Tiverton, both of (GB)

(73) Assignee: Sensornet Limited, Ely (GB)

( * ) Notice: Subject to any disclaimer, the term of this patent is extended or adjusted under 35 U.S.C. 154(b) by 0 days.

(21) Appl. No.: 09/489,413

(22) Filed: Jan. 21, 2000

(30) Foreign Application Priority Data

Jul. 22, 1997 (GB) .............................................. 9715289
Jul. 22, 1998 (WO) .............................. PCT/GB98/02185

(51) Int. Cl.[7] .................................................. G01B 9/02
(52) U.S. Cl. .................. 356/477; 356/480; 250/227.14
(58) Field of Search ................................ 356/73.1, 477, 356/453, 480, 519; 250/227.19, 227.21, 227.27; 385/12

(56) References Cited

U.S. PATENT DOCUMENTS 4,560,246 A * 12/1985 Cotter .......................... 385/27
5,272,334 A    12/1993 Sai
5,448,059 A *  9/1995 Blank et al. ................ 356/73.1

FOREIGN PATENT DOCUMENTS

EP    0681172    8/1995
EP    0715377    5/1996
JP    09079941   3/1997

OTHER PUBLICATIONS

Vobian J., All–Fiber Spectrometer for the determination of the emission wavelengths of semiconductor lasers, Optics Communications, vol. 76, No. 5–6, pp. 332–339 (Abstract).

* cited by examiner

*Primary Examiner*—Samuel A. Turner
(74) *Attorney, Agent, or Firm*—Baker Botts L.L.P.

(57) ABSTRACT

A method for measuring the wavelength of light, particularly short pulses of light, with improved accuracy comprises passing the light down a backscatter medium such as an optical fiber and detecting and measuring the wavelength of the backscattered light which will have a pulse length of potentially far greater length than that of the initial pulse. The use of interferometers in conjunction with a reference light of known wavelength enables very accurate measurements to be made.

22 Claims, 4 Drawing Sheets

WAVELENGTH MEASURING SYSTEM

The present invention relates to an apparatus for the measurement of the wavelength of optical waves and, in particular, to the measurement of wavelengths of short optical pulses and to high accuracy measurements of optical wavelengths.

BACKGROUND OF THE INVENTION

There is a requirement in the field of optical communications for the use of short pulses of light, for high-bit-rate transmission and for optically pure sources of light for wavelength division, multiplexing and soliton pulse transmission. In communication diagnostics it is desirable to determine the wavelength of a single optical pulse, in that the wavelength may differ from pulse to pulse. As the number of multiplexed channels increase down a single fibre, it is also important to obtain the wavelength measurement with increasing accuracy.

In optical sensing applications, there is an increasing need for high-power, short-pulsed optical sources with high wavelength stability between pulses. The accurate wavelength measurement of these sources is essential.

There is a present limitation to the accurate wavelength measurement of short pulses in that conventional apparatus, such as the monochromator, require the scanning of a dispersive element over a time shorter than the duration of the pulse. This is not feasible when the pulse is short. Another conventional technique operates with the detection of light scattered from a dispersive element by an array of detectors. Again, this is not usable with short pulses as the interference path length is limited by the pulse width. Both these techniques can be used with some success to measure the average wavelength of a number of pulses but are unable to accurately quantify the wavelength of each individual pulse.

SUMMARY OF THE INVENTION

This invention uses backscatter in optical fibres to transform the short pulse into a longer one, which is open to wavelength analysis by conventional. techniques. The backscatter process also provides a mechanism for the highly-accurate measurement of the wavelength using the technique described in the present invention.

According to the present invention there is provided apparatus for measuring the wavelength of a pulsed or continuous source of light, which apparatus comprises at least one scatter medium, such as an optical fibre which is able to provide a continuous backscatter signal, a wavelength measurement device which is adapted to operate with a dispersive element or with an interference element and a conversion means for converting an optical signal into an electrical signal, which conversion means comprises a detector or an array of detectors.

The invention also provides a method for measuring the wavelength of a pulsed or continuous source of light which method comprises passing the light down a backscatter medium such as an optical fibre, detecting the backscattered light from the backscatter medium and measuring the wavelength of the backscattered light.

The optical fibre may be single mode, or multimode and may have tailored doping levels, or many different doping layers, to enhance the backscattering. The optical fibre may be physically modulated to reduce the effect of any power variation in the backscatter signal due to coherent interference. The optical fibre may also exhibit birefringence and include polarisation selective components.

In use, light from a test source, the wavelength of which is to be measured, is transmitted down an optical fibre and backscattered light is transmitted back down the fibre. The duration of the light emitted from the test source may be short, but the duration of the backscattered light will be relatively long. The backscattered light will be predominantly of the same wavelength as the transmitted light. This may be measured directly to determine the wavelength of the test source. The backscattered light also contains a Brillouin component which has a frequency shift from the source wavelength that is inversely proportional to the source wavelength. Measurement of this Brillouin shift can yield the source wavelength to high accuracy.

Higher accuracy still can be obtained by comparing the test wavelength with the known wavelength of a reference signal using an interferometer. The difference in the interference orders of the two signals can be determined with a coarser wavelength measurement, such with the measurement of the Brillouin shift, and the higher accuracy can be obtained from the interferometer reading. The interferometer can be calibrated by modulating a reference source at a known frequency.

When light propagates through an optical fibre, a small amount is backscattered. The propagating light generates backscattered light for the duration of twice its transit through the optical fibre. This has the effect that a short pulse will generate a continuous backscattered signal whose duration is twice the time taken for the incident pulse to travel through the fibre, a time which may be significantly larger than the input pulse duration. Thus, as described in the present invention, a short pulse with previously inaccurately determinable wavelength is transformed into a long, backscattered signal which may be accurately spectrally analysed.

The backscattered signal predominantly comprises three components. The elastically scattered Rayleigh signal which has the same wavelength as the input signal, and the significantly weaker inelastically scattered Brillouin Stokes and anti-Stokes signals which have a characteristic wavelength difference from the Rayleigh signal.

The wavelength of the input light pulse may be measured directly from the wavelength of the Rayleigh signal using conventional techniques, such as those stated earlier. The wavelength can be measured to greater accuracy, however, from the analysis of the Brillouin signal. The frequency separation of the Brillouin signal from the Rayleigh signal is inversely proportional to the input light wavelength. Hence, by measuring the frequency shift of the backscattered Brillouin signal, the wavelength of the source signal can be determined. Furthermore, it is possible to determine the Brillouin shift very accurately with the use of interference spectrometers, such as the Fabry-Perot interferometer, and, hence, to measure the source wavelength accurately. In this case, the Brillouin backscatter signal is calibrated by comparing the Brillouin shift generated by a source of known wavelength with the fibre held at a known temperature. Even higher accuracy may be obtained by measuring the relative frequency of the Rayleigh signal with respect to a reference source with a known wavelength.

The reference source may be a single mode or multimode coherent source with known wavelength and it may be a gas laser or a solid-state laser.

Here the Rayleigh signal and the reference signal are scanned simultaneously with an interferometer, for example with a Fabry-Perot interferometer, to measure the apparent frequency separation with a very high accuracy. The overall frequency separation between the two signals would be that apparently measured by the calibrated interferometer scan plus an integer number of free spectral ranges, (The free spectral range is the frequency over which an interference pattern repeats itself, for example, two optical sources whose frequencies differ by an integer number of free spectral ranges would be superimposed.) In this system a coarse wavelength measurement would determine the number of free-spectral-ranges separating the two sources while the interferometer reading provides an accurate determination of the test source wavelength. As described in the present invention, a particularly useful configuration would use the Brillouin shift measurement to provide the coarse wavelength measurement.

The reference source, and/or test source, and/or backscattered signal may be amplified and/or attenuated to match the powers of the measured backscattered signal and the measured reference signal for efficient detection, and optical isolators may be used to prevent instability of the laser sources.

The reference optical fibre may be arranged in a loop such that the test light circulates. The input light may be inserted into the loop, and the backscattered light collected from the loop, by way of a coupler, that may be asymmetric or by an optical switch such as electro-optic modulator. An optical amplifier may be inserted in the loop to maintain a high signal level, even if the input light is a single pulse. Such a loop may also be used in addition to a length of reference fibre. Here, light that is inserted into the loop would gradually feed into the reference fibre to maintain a relatively constant signal. Again, an optical amplifier may be placed in the loop to maintain the power of the circulating light.

The invention can provide an accurate measurement of the Brillouin frequencies and the free spectral range of the interferometer with the use of an optical modulator as described. If light is modulated at a frequency (which can be very accurately determined), then side lobes are generated with this frequency separation from the centre optical frequency. The free spectral range of an interferometer can be calibrated by viewing the spectrum of a reference optical source whilst the source light is modulated. The modulation frequency at which the side lobes from one free spectral range overlap the side lobes from the next is exactly half the free spectral range. Also, if it is required to measure the wavelength of a continuous source instead of a pulsed source, then the input light can be modulated until the side lobes overlap the Brillouin peaks, to accurately measure the Brillouin shift. If the wavelength of a pulsed source is to be measured, then the spectral characteristics of the interferometer can be calibrated by the measurement of the observed separation of known side lobes generated by the modulator. The modulator may be an electro-optic modulator, an integrated optic, fibre optic or bulk device with high frequency response.

The radio frequency may be such that the up-shifted light from one interference order overlaps the down-shifted light from the next, or higher radio frequencies may be used such that non-adjacent orders overlap. This latter case will have the advantage of "gearing" to produce a more accurate free spectral range measurement. The free spectral range and the scan range may be selected such as to optimise the measurement accuracy.

Alternatively, the free spectral range of the interferometer may be determined by measuring the frequency separation of two optical signals with a known optical frequency difference. Such signals may be two lines of a stabilised multimode laser.

The optical signals are converted to electrical signals and are fed into a computer and recorded in the desired form. From the analysis of the spectrum produced by the interferometer and the measurement of the temporal behaviour, the present invention may also be used to measure the linewidth of a test source, and to examine any spectral features.

BRIEF DESCRIPTION OF THE DRAWINGS

The invention is described with reference to the accompanying drawings in which.

DETAILED DESCRIPTION OF THE PREFERRED EMBODIMENTS

Figure 1:
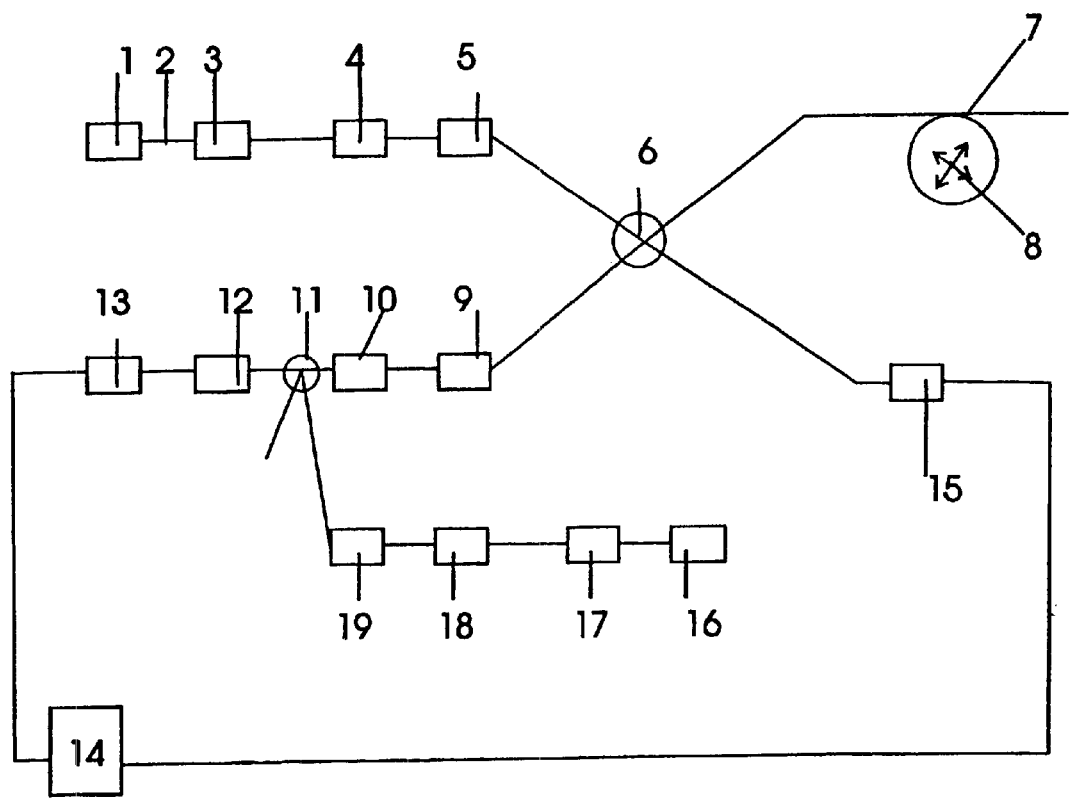
FIG. 1 is a diagram of an embodiment of the present invention, in which a reference source is used and its output is fed directly into an interferometer.

Referring to FIG. 1, a test light source (1) is connected by optical fibre (2) to an optical isolator (3) and then a coupler (6). An optical amplifier (5) may amplify light from the test source and/or the returning backscattered signal, if the signal level is low. The coupler (6) is connected to the reference optical fibre (7) in which the backscattered signal is generated. The reference optical fibre may be physically modulated using a stretching apparatus (8). An optical modulator (4) may be used to modulate the amplitude of the test source (1).

The reference source (16) is connected by optical fibre to an optical modulator (17) and then to an optical isolator (18), which connects to a coupler (11). Light from the reference source may be attenuated, with an optical attenuator (19), to approximately match the reference signal level to the backscattered Rayleigh signal level.

A modulator (17) may be used to modulate the output of the reference source in order to calibrate the free spectral range, and the frequency calibration of the interferometer (12). A high-speed detector (15) may be used to directly detect the input light to measure the temporal characteristics of the test source. An optical modulator (4) may be used to gate the output of the test source (1) and so select which pulses propagate in the optical fibre at any one time. This is necessary if the pulse repetition time is less than the round-trip time in the fibre.

The interferometer (12) is connected to the coupler (11) by optical fibre and receives the backscattered light generated by the test source (I) and direct illumination from the reference source (16). An optical bandpass filter (10) may be used to reduce any broadband light produced by any optical amplifier(s) (5) and (9) used being detected. The optical signal is converted to an electrical signal at the photodetector (13) and the electrical signals are analysed at the computer (14).

In use, light circulates around the loop where it may be amplified by the optical amplifier. The amplifier may be configured to reduce the attenuation of the input light, to cancel the attenuation of the input light, or to increase the power of the input light, as the input light circulates around the loop. Preferably, the amplifier will at least cancel the input light attenuation such that the input light will circulate, and backscattered light will be generated, for as long as the amplifier is operated. This mode of operation allows accurate measurement of continuous wave light, pulsed light and single pulses.

Figure 2A:
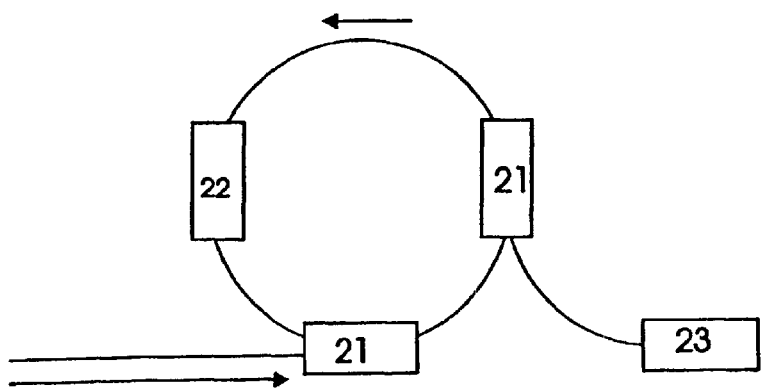
FIGS. 2a, 2b, 2c, 2d, 2e and 2f are diagrams showing the use of a circulating loop as the reference signal

In FIG. 2a, light circulates around the loop, causing backscattered light to be generated in the loop. The position of the amplifier within the loop, which may be many kilometres long, may be chosen to optimise the backscattered signal.

Figure 2B:
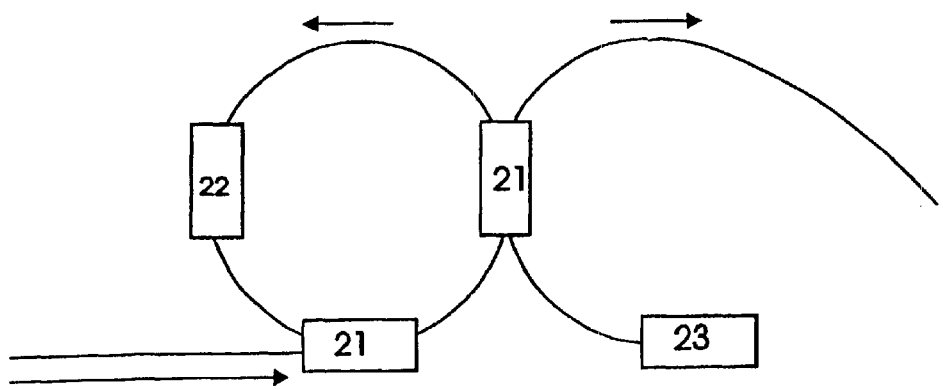

In FIG. 2b, an additional length of fibre is added to the arrangement in FIG. 2a at the second output port of the coupler, as shown. This increases the amount of backscatered light.

Figure 2C:
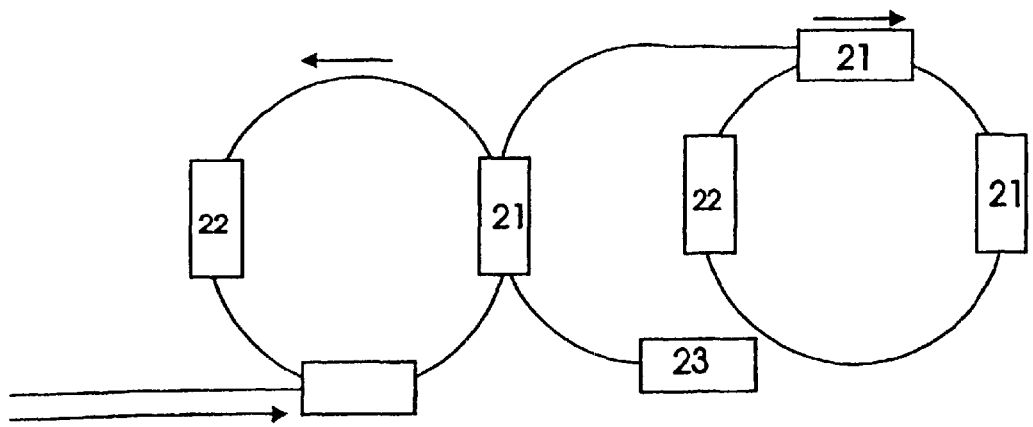

In FIG. 2c, a second loop is added which operates in the same manner as that described in 2a. This arrangement again increases the amount of backscattered light from the case shown in FIG. 2a.

Figure 2D:
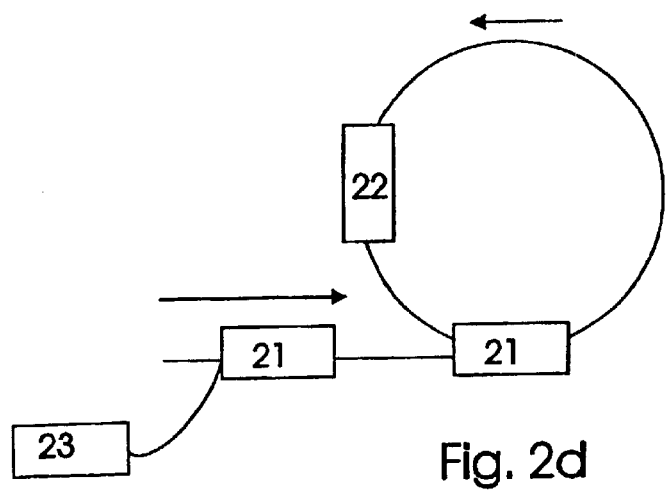

FIG. 2d shows an arrangement similar to that shown in FIG. 2a but with the detecting apparatus placed in a different position.

Figure 2E:
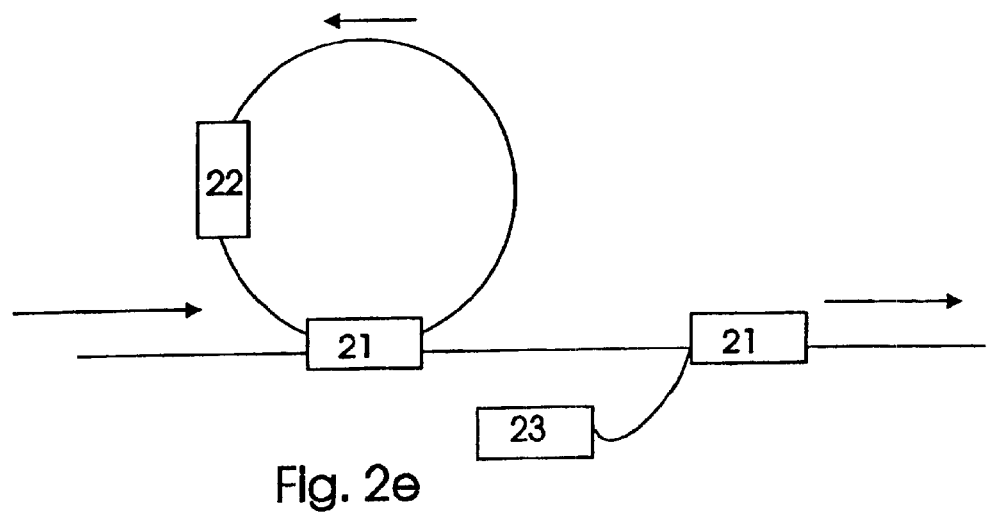

FIG. 2e shows an arrangement where the loop circulates the input light and feeds a fraction of this circulated light into a length of optical fibre. The backscattered signal is measured from this length of fibre. In this arrangement, it may be preferable to have different types of fibre for the loop and the length of fibre generating the backscatter.

Figure 2F:
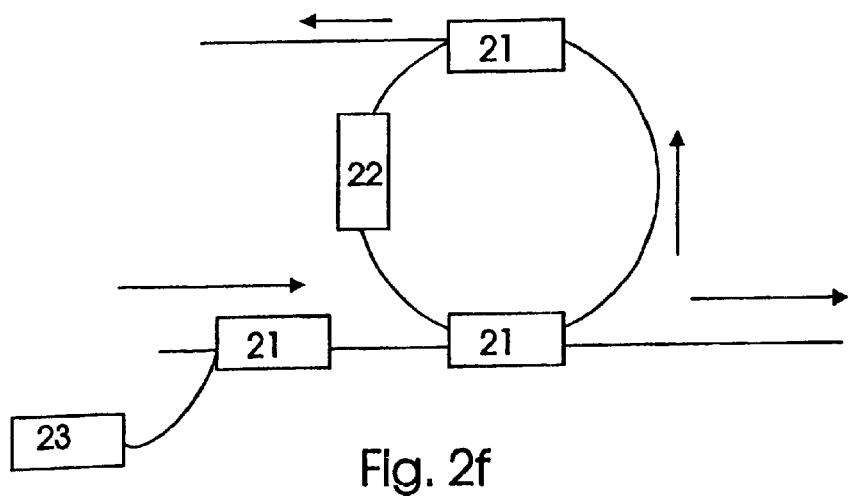

FIG. 2f shows a similar arrangement to that in FIG. 2e but employs two lengths of fibre to increase the backscatter signal. The detector apparatus is positioned before the loop so that it can collect backscattered light from both fibres.

Figure 3:
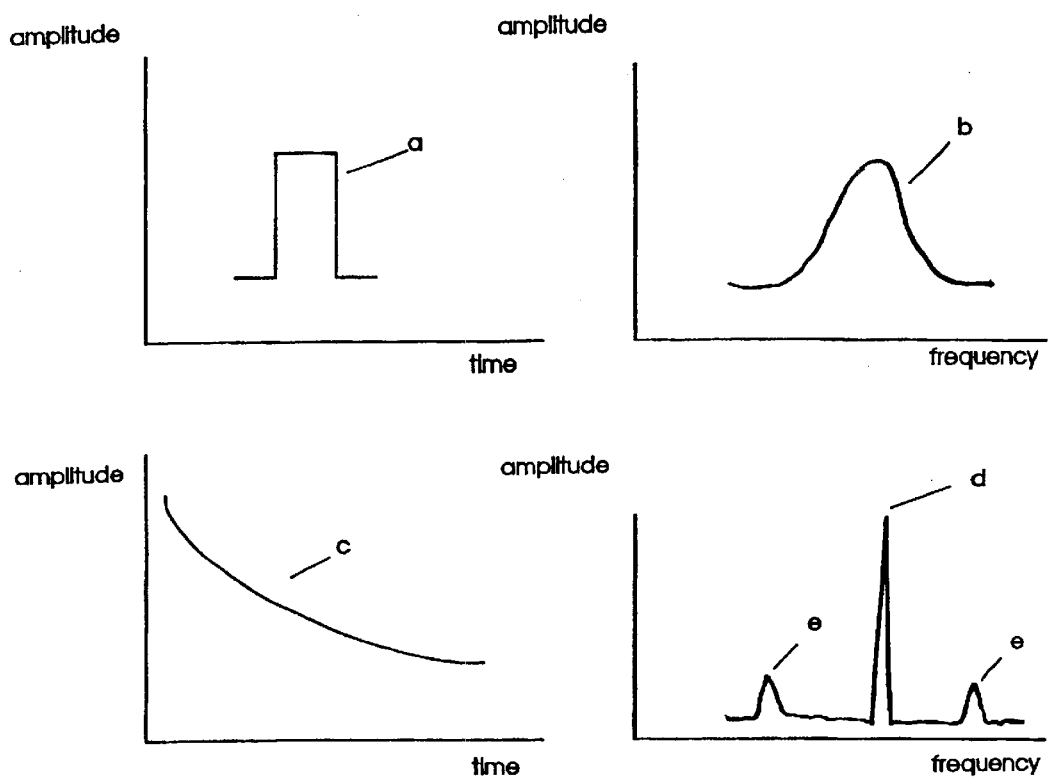
FIG. 3 is a diagram showing the temporal and spectral features of a short light pulse and the backscattered signal it generates.

Referring to FIG. 3, the forward propagating pulse is short in duration (a) and thus its Fourier transform is broad in frequency (b). The centre frequency is poorly defined. The backscatter signal is long in duration (c) and hence its Fourier transform is narrow in frequency (d). The centre frequency is well defined and thus can be measured accurately. In addition, the two generated brillouin peaks have a well defined frequency (e) and their separation from the Rayleigh peak may be measured to determine the wavelength of the test source as described in the present invention.

We claim:

1. Apparatus for measuring the wavelength of a pulsed or continuous source of light, which apparatus comprises
   (i) at least one scatter medium selected from the group consisting of a single mode optical fibre and a multi mode optical fibre which comprises at least one tailored doping level to enhance the backscattering and which provides continuous backscattered light when light is transmitted through the medium; and
   (ii) a wavelength measurement means which measures the wavelength of the backscattered light from the scatter medium.

2. Apparatus according to claim 1 wherein the optical fibre exhibits birefringence and includes polarisation selective components.

3. Apparatus according to claim 1 wherein the optical fibre is arranged in a loop and comprising means to insert input light into the loop and means for collecting backscattered light from the loop.

4. Apparatus for measuring the wavelength of a pulsed or continuous source of light, which apparatus comprises
   (i) at least one scatter medium selected from the group consisting of a single mode optical fibre and a multi mode optical fibre which comprises at least one tailored doping level to enhance the backscattering and which provides continuous backscattered light when light is transmitted through the medium; and
   (ii) a wavelength measurement means which measures the wavelength of the backscattered light from the scatter medium,
   wherein the apparatus further comprises means to physically modulate the optical fibre.

5. Apparatus for measuring the wavelength of a pulsed or continuous source of light, which apparatus comprises
   (i) at least one scatter medium selected from the group consisting of a single mode optical fibre and a multi mode optical fibre which comprises at least one tailored doping level to enhance the backscattering and which provides continuous backscattered light when light is transmitted through the medium; and
   (ii) a wavelength measurement means which measures the wavelength of the backscattered light from the scatter medium,
   wherein the apparatus further comprises a reference source of light of known wavelength and comparison means for comparing the wavelength of the backscattered light with the wavelength of the reference source of light.

6. Apparatus according to claim 5 comprising means for amplifying at least one selected from the group consisting of a signal generated from the reference source of light and a signal generated from the backscattered light.

7. Apparatus according to claim 5 comprising means for attenuating at least one selected from the group consisting of a signal generated from the reference source of light and a signal generated from the backscattered light.

8. Apparatus according to claim 5 comprising means for attenuating at least one selected from the group consisting of a signal generated from the reference source of light and a signal generated from the backscattered light.

9. Apparatus for measuring the wavelength of a pulsed or continuous source of light, which apparatus comprises
   (i) at least one scatter medium selected from the group consisting of a single mode optical fibre and a multi mode optical fibre which comprises at least one tailored doping level to enhance the backscattering and which provides continuous backscattered light when light is transmitted through the medium; and
   (ii) a wavelength measurement means which measures the wavelength of the backscattered light from the scatter medium,
   wherein the apparatus further comprises means to physically modulate the optical fibre and means to measure a Brillouin shift of the backscattered light.

10. Apparatus according to claim 9 wherein the means to measure the Brillouin shift comprises an interferometer.

11. A method for measuring the wavelength of a pulsed or continuous source of light, which method comprises passing the light down a backscatter medium selected from the group consisting of a single mode optical fibre and a multi mode optical fibre which comprises at least one tailored doping level to enhance the backscattering, detecting the backscattered light from the backscatter medium and measuring the wavelength of the backscattered light.

12. A method for measuring the wavelength of a pulsed or continuous source of light, which method comprises passing the light down a backscatter medium selected from the group consisting of a single mode optical fibre and a multi mode optical fibre which comprises at least one tailored doping level to enhance the backscattering, detecting the backscattered light from the backscatter medium and measuring the wavelength of the backscattered light, wherein the method further comprises physically modulating the optical fibre.

13. A method according to any one of claim 11 or claim 12 wherein the wavelength of the backscattered light is determined by measurement of a Brillouin shift of the backscattered light.

14. A method for measuring the wavelength of a pulsed or continuous source of light, which method comprises passing the light down a backscatter medium selected from the group consisting of a single mode optical fibre and a multi mode optical fibre which comprises at least one tailored doping level to enhance the backscattering, detecting the backscattered light from the backscatter medium and measuring the wavelength of the backscattered light, wherein the method further comprises comparing the wavelength of the backscattered light with a known wavelength of a reference light source using an interferometer.

15. A method according to claim 14 comprising (i) simultaneously scanning a Rayleigh signal of the backscattered light and the reference light source with an interferometer, (ii) measuring an apparent frequency separation plus an integer number of free spectral ranges, between the backscattered light and reference source, (iii) determining the number of free-spectral-ranges separating the backscattered light and reference source, and (iv) calculating the frequency of the backscattered light.

16. A method according to claim 15 comprising modulating the source light with one selected from the group consisting of an electro-optic modulator, an integrated optic, a fibre optic and a bulk device with high frequency response.

17. A method according to claim 15 comprising amplifying at least one selected from the group consisting of a signal generated by the reference source of light and a signal generated by the backscattered light.

18. A method according to claim 15 comprising attenuating at least one selected from the group consisting of a signal generated from the reference source of light and a signal generated from the backscattered light.

19. A method according to claim 15 comprising calculating a free spectral range of the interferometer by viewing the spectrum of the reference light source whilst the source light is modulated, wherein the modulation frequency at which side lobes from one free spectral range overlap side lobes from the next free spectral range is half the free spectral range.

20. A method according to claim 19 comprising determining the free spectral range of the interferometer by measuring the frequency separation of two optical signals having a known optical frequency difference.

21. A method according to claim 18 comprising modulating the source light using an optical modulator.

22. A method according to claim 21 wherein the source light is modulated until the side lobes overlap Brillouin peaks.

* * * * *